US010958335B2

(12) United States Patent
Kaen (10) Patent No.: US 10,958,335 B2
(45) Date of Patent: Mar. 23, 2021

(54) INTERMEDIARY SATELLITE NETWORK FOR CROSS-STRAPPING AND LOCAL NETWORK DECONGESTION

(71) Applicant: Cloud Constellation Corporation, Los Angeles, CA (US)

(72) Inventor: Hooshang Kaen, Los Angeles, CA (US)

(73) Assignee: CLOUD CONSTELLATION CORPORATION, Los Angeles, CA (US)

( * ) Notice: Subject to any disclaimer, the term of this patent is extended or adjusted under 35 U.S.C. 154(b) by 0 days.

(21) Appl. No.: 16/174,209

(22) Filed: Oct. 29, 2018

(65) Prior Publication Data

US 2019/0074893 A1 Mar. 7, 2019

Related U.S. Application Data

(63) Continuation of application No. PCT/US2017/030276, filed on Apr. 28, 2017.

(60) Provisional application No. 62/328,627, filed on Apr. 28, 2016.

(51) Int. Cl.
| | | |
|---|---|---|
| *H04B 7/185* | (2006.01) | |
| *H04B 7/19* | (2006.01) | |
| *H04B 7/195* | (2006.01) | |
| *H04W 84/06* | (2009.01) | |
| *H04H 20/74* | (2008.01) | |

(52) U.S. Cl.
CPC .......... *H04B 7/18521* (2013.01); *H04B 7/19* (2013.01); *H04B 7/195* (2013.01); *H04H 20/74* (2013.01); *H04W 84/06* (2013.01); *H04B 7/185* (2013.01)

(58) Field of Classification Search
CPC ...... H04B 7/18521; H04B 7/19; H04B 7/195; H04B 20/74; H04B 7/185; H04W 84/06
USPC ............ 455/12.1, 11.1, 13.1, 13.2, 427–428; 370/315–316
See application file for complete search history.

(56) References Cited

U.S. PATENT DOCUMENTS

| | | | | |
|---|---|---|---|---|
| 6,208,625 B1 * | 3/2001 | Zancho | ............. | H04B 7/18589 370/316 |
| 2014/0105100 A1 * | 4/2014 | Tronc | ................ | H04B 7/18515 370/321 |
| 2014/0241239 A1 * | 8/2014 | Chang | ............... | H04B 7/18504 370/316 |
| 2015/0381267 A1 * | 12/2015 | Tronc | .................. | H04B 1/7115 370/320 |

* cited by examiner

*Primary Examiner* — Yuwen Pan
*Assistant Examiner* — Angelica M Perez
(74) *Attorney, Agent, or Firm* — West Coast IP, P.C.; Matthew D. Bottomly (57) ABSTRACT

A space-based electronic data transfer network system is disclosed. The space-based electronic data transfer network system connects to multiple external sources and transmits information securely within the network, enabling information to be quickly communicated between external satellites and ground stations. The space-based electronic data transfer network system is modularly expandable and additional external satellites and communications frequencies may be incorporated into the network by simply adding one or more additional satellites capable of communicating with the external satellite or communications frequency.

17 Claims, 6 Drawing Sheets

INTERMEDIARY SATELLITE NETWORK FOR CROSS-STRAPPING AND LOCAL NETWORK DECONGESTION

CROSS REFERENCE TO RELATED APPLICATIONS

This application is a continuation of and claims the benefit of priority to International Application No. PCT/US17/30276 titled "INTERMEDIARY SATELLITE NETWORK FOR CROSS-STRAPPING AND LOCAL NETWORK DECONGESTION" and filed Apr. 28, 2017, which claims the benefit of priority to and is a continuation of U.S. Provisional Application No. 62/328,627, filed Apr. 28, 2016, and titled "INTERMEDIARY SATELLITE NETWORK FOR CROSS-STRAPPING AND LOCAL NETWORK DECONGESTION," which is incorporated herein by reference in its entirety. Additionally, U.S. Provisional Application No. 62/111,600, filed Feb. 3, 2015 and titled "SkyCloud Autonomous Electronic Data Storage and Information Delivery Network System," international application PCT/US16/16467, filed Feb. 3, 2016 and titled "Space-Based Electronic Data Storage and Transfer Network System", and U.S. Non-provisional Application No. 15/225,826, filed Aug. 2, 2016, and titled "Space-Based Electronic Data Storage and Transfer Network System" are all incorporated herein by reference in their entirety.

FIELD OF THE INVENTION

The document relates generally to communication with and between orbital satellites. This document relates more particularly to a space-based electronic data transfer network system of interconnected communications satellites.

BACKGROUND INFORMATION

Modern communications rely heavily on orbital satellites, and different types of communications rely on different types of orbital satellites. A satellite achieves a stable orbit when the satellite's kinetic energy balances its potential energy. This balance occurs when the velocity of the satellite is balanced by the centripetal force of gravity, creating a stable circular or elliptical orbit. The closer a satellite is to the earth, the higher the velocity necessary to balance the centripetal force. A geostationary orbit (GEO) is an orbit that appears to maintain a fixed position relative to a point on the surface of the rotating Earth. All geostationary satellites orbiting the Earth orbit at approximately 42,164 kilometers (or 26,199 miles) from the center of the earth, which requires an orbital velocity of 11,068 kilometers (6,878 miles) per hour.

There are upsides and downsides to different satellite orbits, and owners have to select the best orbit for each satellite's intended activity. Geosynchronous orbits maintain the same roughly 24 hour orbital period as the earth's rotation. Geostationary orbits are a subset of geosynchronous orbits that appear to maintain an apparent fixed position in the sky. Geostationary orbiting satellites are capable of maintaining long duration connections with a ground station due to their apparent fixed position; however the distance from the earth introduces lag time as any request travelling from the surface of the earth, 36,000 kilometers to a geosynchronous satellite and 36,000 km back to the ground station. Even at the 299,792,458 meter per second speed of light, the minimum latency (ignoring delays within the electronics) to receive a response from a geosynchronous satellite is on the order of a quarter second (approximately 240 milliseconds), and this latency is doubled if your request has to be sent from a user to the GEO satellite to a ground station back to the GEO satellite and back to the user. Additionally launching a geosynchronous orbit satellite can be significantly more expensive than launching a lower orbit satellite due to the additional energy necessary to transport hundreds or thousands of kilograms against the force of the Earth's gravity across tens of thousands of kilometers. The radius of a geostationary orbit causes the satellite to travel within the Van Allen belt, exposing geostationary and other geosynchronous satellites; by contract, the Van Allen belt actually shields lower orbiting satellites from solar and background radiation.

By contract, low earth orbit (LEO) satellites appear to zoom around the earth, sometimes orbiting the earth multiple times each day. For example, a satellite orbiting 800 kilometers above the earth must travel faster than 26,000 kilometers per hour to maintain orbit. A ground station communicates with low-earth orbit (LEO) satellites during fixed windows as the satellite traverses the sky, but because the distance between the satellite and the ground station is only 800 milliseconds, a ground station can rapidly send inquiries and receive responses with a brief 2-3 millisecond delay. LEO satellites can also be significantly more cost effective to place into orbit than GEO satellites, so it is relatively easier to expand a LEO satellite network ring 200.

Due to the differences in connection window, price, and latency different satellite orbits are used for different communication purposes. The half second communications delay makes a geostationary satellite an ineffective node for telephone conversations or general purpose internet access, but that same delay is not noticeable for broadcast services such as satellite television, satellite radio, and even large downloads or on-demand streaming media services (e.g., Twitch® Youtube® or Netflix®) once the initial connection is established. The latency is generally attributed to a generally accepted "load time", and users don't differentiate between satellite communication delays and local buffering. By contract, LEO satellites may be inferior to GEO satellites for some systems requiring prolonged, stable connection periods such as broadcasting.

Additionally satellites can communicate between each other, both within a single orbit (e.g., LEO or GEO) or between multiple different orbits (e.g., LEO to different elevation LEO, LEO to different orbital plane LEO, or LEO to GEO). Indeed, LEO satellites frequently communicate with GEO satellites as they pass through the GEO satellites coverage area(s).

Different satellites carry different types of communications arrays, including but not limited to infrared, radio frequency, optical laser, etc. A single satellite may include multiple different communications arrays including capabilities to communicate within multiple different frequency ranges. Common satellite communication ranges include, but are not limited to the L-band, S-band, C-band, X-band, Ku-band, K-band, Ka-band, V-band, and W-band, all within the range of microwave frequency communication).

In some instances, it may be desirable to transmit information from a first satellite to a second satellite. Traditionally, the first satellite would transmit to a ground station, the information would be sent via ground-based communications systems (e.g., cables, antennae, towers, etc.) around the world to a second ground station capable of transmitting that information to the second satellite. Even if the first satellite and second satellite are relatively close to each other, communication between the first satellite and second satellite required an intermediary ground station.

In other instances a satellite on one side of the world may need to transmit information to a distant location on the surface of the Earth outside the satellite's range. Historically, the first satellite would communicate with a ground station in the first satellite's coverage area and that communication would be transmitted via ground-based communications systems to the intended recipient.

The combination of ground-based communications and ground station to satellite communication introduces delays and potential inefficiencies. Each medium is subject to different limitations, restrictions, and latency, so combining the two communications media subjects the information to both sets of drawbacks.

Because satellites are often limited to the hardware available and included at initial launch, there is not much opportunity to upgrade satellites once set in orbit. The ground station may upload some software upgrades or navigation/logistics commands to the satellite, but hardware upgrades it is not generally feasible to update existing satellites, especially geosynchronous satellites due to their significant distance, to add functionality or communication.

Accordingly the inventors have recognized that there is a need for an improved satellite network ring 200 that adds functionality to new and existing satellites by connecting a network of inter-connected (or "cross-strapped") satellites capable of bridging the connection between other satellites and ground stations.

SUMMARY

Various aspects of a uniquely designed modular, space-based communications network ("satellite network ring") are disclosed. The satellite network ring is configured so that multiple ring-incorporated satellites within the satellite network ring are communicatively connected through high-speed communications arrays, and these ring-incorporated satellites can connect to other satellites or ground stations to facilitate communication between satellites, between ground stations, or between a ground station and a satellite. In one aspect, the satellite cloud network includes a plurality of intercommunicating data storage satellites, each configured to store data, and each capable of sending data to or retrieving data from the other data storage satellite through a communications network (e.g., laser communication or radio frequency communication).

The satellite network ring is modular and expandable with a plurality of inter-connected satellites of different configurations and specifications. Instead of launching an additional geostationary satellite or upgrading an existing satellite (while it travels in excess of 10,000 kilometers per hour through the vacuum of space), one or more ring-incorporated satellites capable of communicatively connecting to the can be launched. The newly introduced ring-incorporated satellite(s) communicate with the other ring-incorporated satellites in the satellite network ring to rapidly transmit the information around the globe without needing to pass through a ground station or ground-based communications media.

Each ring-incorporated satellite within the satellite network ring may communicate in a different band with some ring-incorporated satellites capable of externally communicating only with ground stations, some ring-incorporated satellites capable of externally communicating only with geostationary satellites, some ring-incorporated satellites providing data storage capabilities, and even other ring-incorporated satellites only capable of bridging connections between other ring-incorporated satellites. Because each of these ring-incorporated satellites communicates within the ring, information can be rapidly transmitted between any two points, including ground stations and satellites outside of the satellite network ring.

In one embodiment, the satellite network ring consists of 6 or more ring-incorporated satellites in a single-plane, low-earth orbit approximately 800 kilometers above the surface of the Earth. Each satellite communicates with the satellite immediately in front and the satellite immediately behind. Each satellite is capable of retransmitting information received from a satellite on one side to the next satellite on the opposite direction, creating a complete ring of communication.

In some embodiments, the satellite network ring includes additional satellites, enabling each satellite to communicate with satellites beyond the immediately preceding or immediately following ring-incorporated satellite. A processor in one of the ring-incorporated satellites or on the ground may calculate an optimized path to transmit information from the source to the destination, which may include minimizing retransmissions and skipping ring-incorporated satellites. For example, the optimum path may bypass multiple ring-incorporated satellites. In some instances, the optimized path may involve sending information "the long way" around the globe due to bandwidth constraints.

In other embodiments, the global ring network includes a plurality of ring-incorporated satellites disbursed across multiple orbital planes. Ring-incorporated satellites may communicate between the different orbital planes to optimize transmission path.

Additionally, each satellite may communicate in a different band or serve a different purpose. Some ring-incorporated satellites may be capable of externally communicating only with ground stations, some ring-incorporated satellites may be capable of externally communicating only with geostationary satellites, some ring-incorporated satellites may provide data storage capabilities, and still other ring-incorporated satellites may serve only to bridge connections between other ring-incorporated satellites to provide additional connections or bandwidth. Because each of these ring-incorporated satellites communicates within the ring, information can be rapidly transmitted between any two points, including ground stations and satellites outside of the satellite network ring.

DETAILED DESCRIPTION

The features, aspects and advantages are described below with reference to the drawings, which are intended to illustrate but not to limit the invention. In the drawings, like reference characters denote corresponding features consistently throughout similar embodiments. FIGS. 1-5 illustrate various aspects of an embodiment of the satellite network ring. It should be understood, however, that the various aspects and teachings therein embodied are not limited to any particular mobile device or case implementation.

Figure 1:
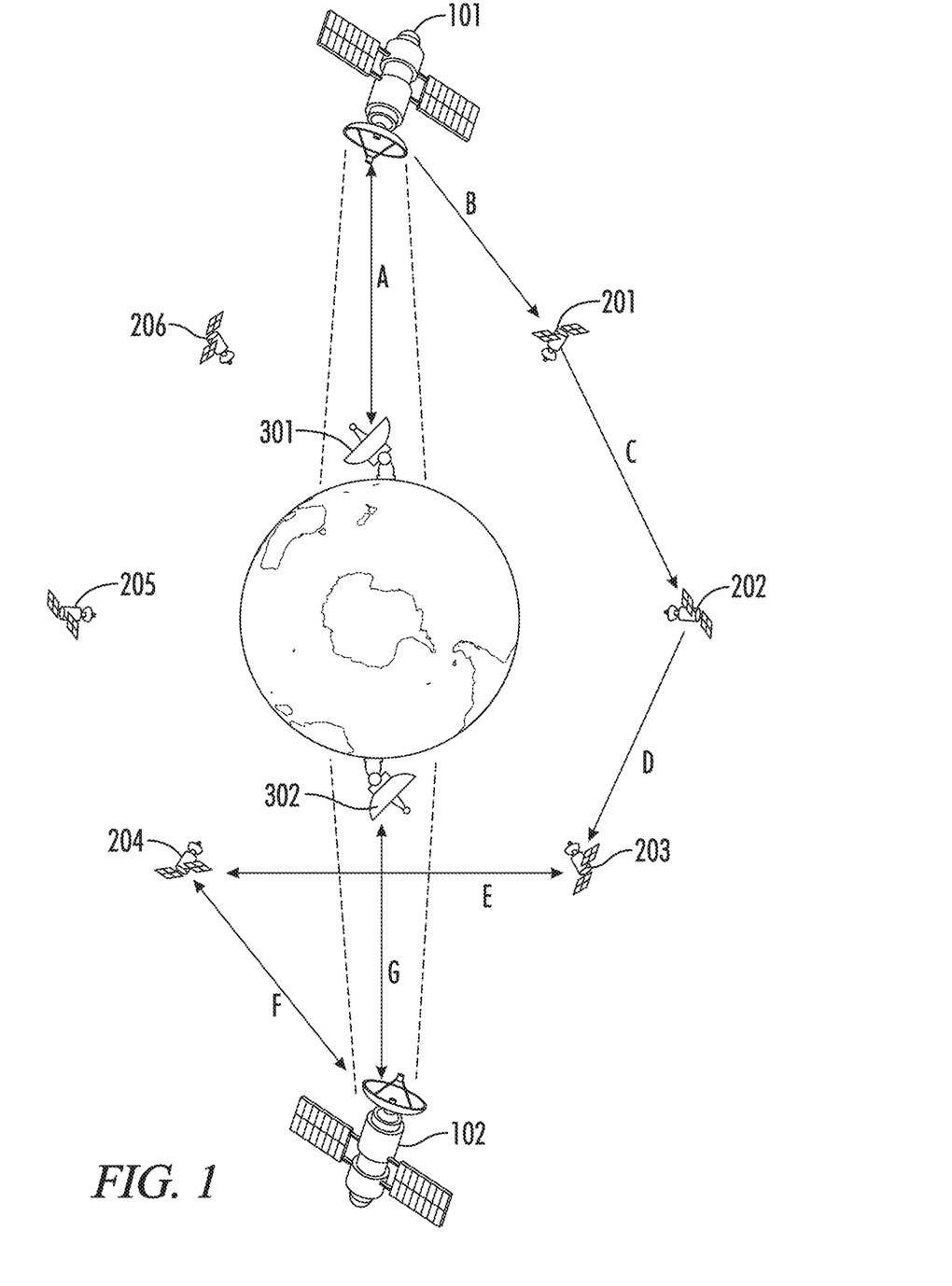
FIG. 1 is a schematic view of an exemplary satellite network ring in accordance with an embodiment of the present disclosure.
Figure 2:
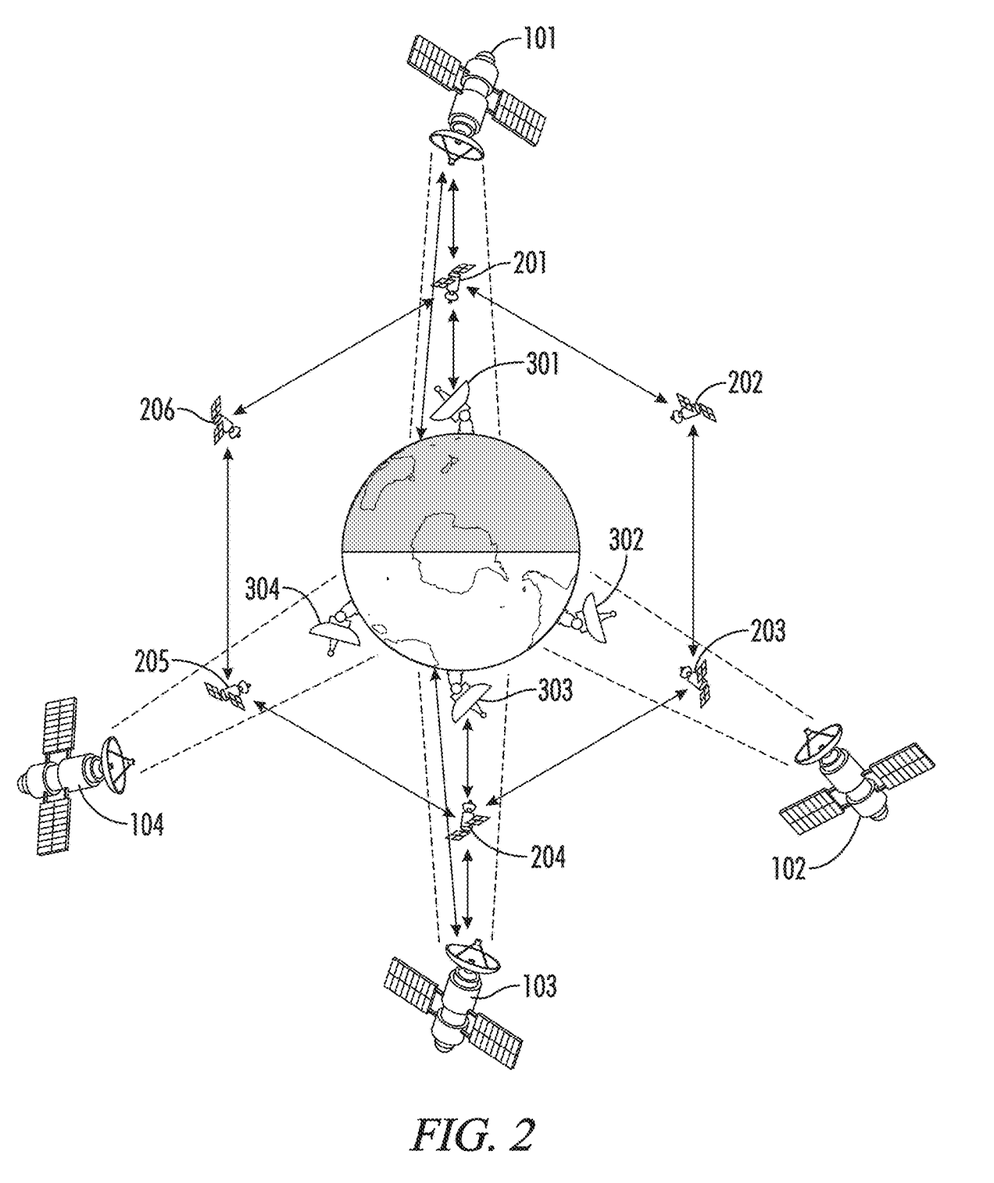
FIG. 2 is a second schematic view of an exemplary satellite network ring in accordance with an embodiment of the present disclosure, illustrating some of the potential communication paths between external satellites, ring-incorporated satellites, and ground stations.
Figure 3:
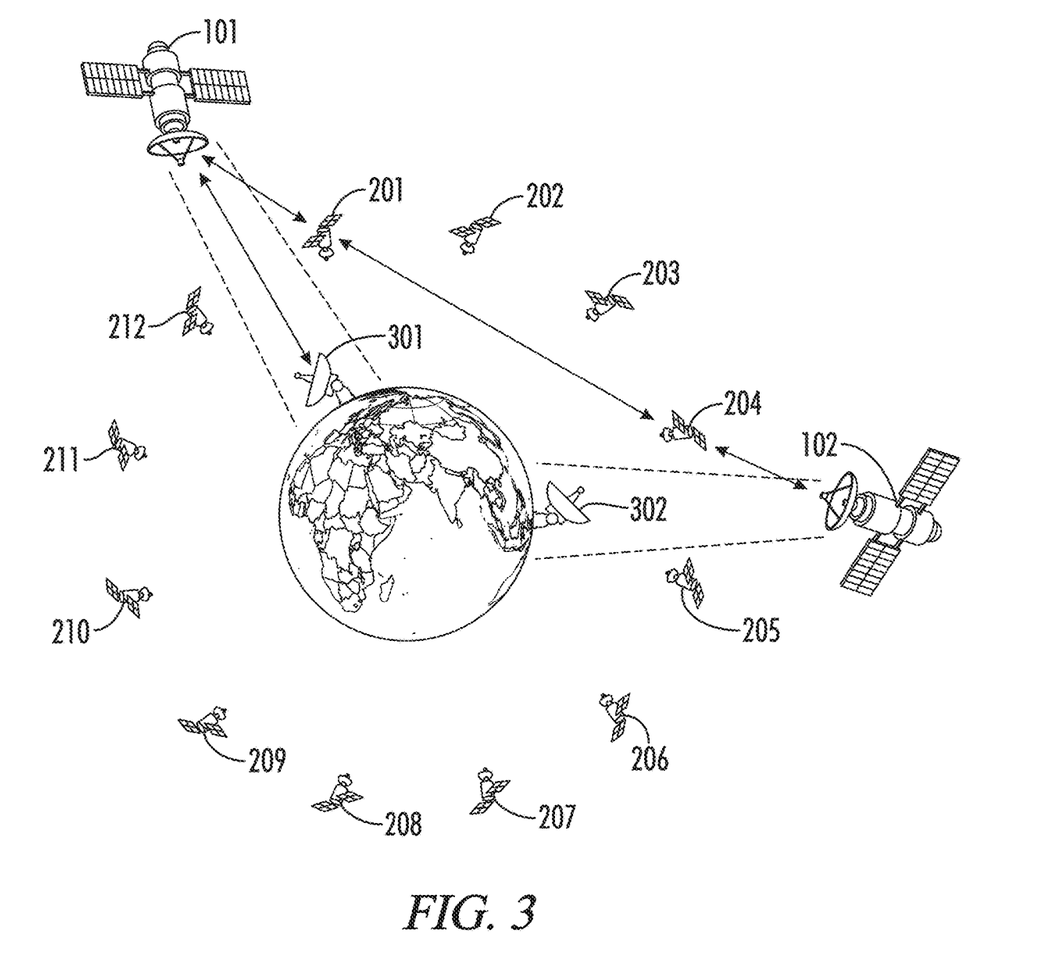
FIG. 3 is a schematic view of an exemplary satellite network ring in accordance with an embodiment of the present disclosure, illustrating optimized communication paths.

FIGS. 1 through 3 illustrate embodiments of a space-based electronic data transfer network system ("satellite network ring" or "SkyCloud") 200.

FIG. 1 illustrates an embodiment of the satellite network ring 200 depicting a plurality of ring-incorporated satellites 201, 202, 203, 204, 205, 206 occupying a single orbital plane in a low-earth orbit. External satellites 101, 102 are illustrated as geosynchronous communications satellites. Ground stations 301, 302 on the surface of the Earth are depicted as located in the coverage area of external satellites 101, 102 respectively. The arrows depict information transmitted from ground station 301 along path A to external satellite 101 along path B to ring-incorporated satellite 201 along path C to ring-incorporated satellite 202 along path D to ring-incorporated satellite 203 along path E to ring-incorporated satellite 204 along path F to external satellite 102 along path G to ground station 302. In this embodiment, at least ring-incorporated satellites 201 and 204 are capable of communication with external geosynchronous satellites, while ring-incorporated satellites 202 and 203 functioned as bridges between ring-incorporated satellite 201 and ring-incorporated satellite 204. Instead of sending the communication across terrestrial cables, the communication travelled from one side of the Earth to the opposite side of the Earth through entirely space-based communications.

In the present embodiment, the low-earth orbit is approximately 800 kilometers above the surface of the Earth. At this radius, information completing a circuit from ring-incorporated satellites 201 to 202 to 203 to 204 to 205 to 206 and back to 201 travel approximately 45,000 kilometers. At the speed of light, that entire circuit introduces approximately 150 milliseconds of latency, though optimized paths would rarely require much more than half of a circuit or approximately 75 millisecond of latency. Although the figure illustrates a satellite network ring 200 consisting of 6 ring-incorporated satellites 201, 202, 203, 204, 205, 206 in a single orbital plane, it should be understood that the satellite network ring 200 could include more or fewer satellites and those ring-incorporated satellites could occupy multiple orbital planes. Additional ring-incorporated satellites may provide additional bandwidth, emergency back-up, alternate communication paths, data storage, and/or alternate external connection points, and/or data storage.

While FIG. 1 illustrates communication from Ground Station 301 to External Satellite 101 to Ring-incorporated satellite 201, in some instances, it may be possible or preferable to enable communication directly from a ground station 301 to a ring-incorporated satellite 201 and from ring-incorporated satellite 204 to ground station 302. The present communication path A-B-C-D-E-F-G incorporates a distance of approximately 165,000 kilometers (or approximately 550 milliseconds of distance latency), approximately 140,000 kilometers of which is spent travelling to or from an external satellite 101, 102. If the communication could travel from ground station 301 to ring-incorporated satellite 201 along path C to path D to path E and then from ring-incorporated satellite 204 to ground station 302, that communication path could be reduced to approximately 25,000 kilometers (or approximately 85 milliseconds of distance latency).

FIG. 2 illustrates an alternate embodiment of the satellite network ring 200 including additional ground stations 303, 304 and additional external satellites 103, 104. FIG. 2 also illustrates each shortest communication link with arrows. In the present configuration, ground stations 302, 303, and 304 are on the day side of the Earth while ground station 301 is on the night side of the Earth. When a user in external satellite's 103 coverage area sends a request through a satellite provider, that user's request is fulfilled by ground station 303, which transmits the response to external satellite 103 and in turn to the user. Satellite internet access and satellite on-demand services require the ground station 303 to transmit content to external satellite 103 to be rebroadcast to users in external satellite's 103 coverage area. In most modern networks, communications access points have greater downstream bandwidth than upstream bandwidth. During high traffic periods (e.g., daytime business hours in the present figure), the locally requested upstream responses from ground stations 302, 303, 304 to each respective external satellite 102, 103, 104 may exceed each the ground stations' maximum upstream bandwidth or may experience delays based on traffic congestion. The satellite network ring 200 enables providers to decongest local upstream resources during peak traffic by offloading non-latency sensitive traffic through the satellite network ring 200 to non-peak ground stations 301.

To reduce the upstream congestion at ground stations 302, 303, 304, the satellite network ring 200 enables a provider to offload some upstream traffic by requesting non-latency sensitive requests (e.g., e-mail delivery, streaming media, broadcast media, and large downloads) from non-peak ground station 301 to external satellite 101 and on through the satellite network ring 200 to then be distributed through the correct external satellite 102, 103, 104. Even though these non-latency sensitive requests travel significant distances, and are therefore subject to increased latency, once the link is established and buffering completes, the impacted users may be unaware of the latency; however the total network traffic and local latency-sensitive requests will benefit from the reduced local upstream traffic. Although peak and non-peak traffic are indicated by day and night in the present example, peak and non-peak traffic may be unrelated to time or may even be adjusted and switched on the fly by network control based on relative traffic to improve user satisfaction. This network decongestion also enables satellite service providers to obtain content from lower cost providers in other regions of the world or to carry otherwise unavailable local content.

FIG. 3 illustrates an optimized communication path between ground station 301 and ground station 302. Ground station 301 transmits to external satellite 101 along path V and external satellite 101 retransmits along path W to ring-incorporated satellite 201, where the communication is incorporated into the satellite network ring 200. Instead of transmitting the content to the next consecutive ring-incorporated satellite 202, the network management system (not shown) calculates an optimized communication path and transmits directly to ring-incorporated satellite 204 along path X, shortening the distance and latency. Ring-incorporated satellite 204 then transmits along path Y to external satellite 102 which completes the communication by transmitting the communication along path Z to ground station 302. Although the present illustration travels through only 2 ring-incorporated satellites, in other instances, this communication path might incorporate a number of communication paths. In the event that one or more satellites 209, 210, 211 in the satellite network ring are unavailable, (e.g., due to damage, interference, local regulations, security risks, or local traffic), the network management system can direct a communication path along an alternate route. In some instances, the alternate path bypasses the unavailable ring-incorporated satellites by transmitting directly from ring-incorporated satellite 208 to ring-incorporated satellite 212. In other instances, the alternate path will incorporate ring-incorporated satellites from other orbital planes (not shown). In still other instances, the alternate path will travel around the network in the opposite direction (e.g., completing a path from ring-incorporated satellite 208 to 205 to 202 to 212) to complete the transmission despite the unavailable satellites 209, 210, 211. Path optimization enables the system to take advantage of any allowable path to complete a transmission and improves the durability, reliability, and speed of the satellite network ring 200. In another embodiment, if weather or hardware failure does not permit direct transmission from the satellite network ring 200 to a particular ground station 301, the network management system (not shown) optimizes an alternate path, connecting through an alternate ground station and completing the connection through ground-based communications systems.

Figure 4:
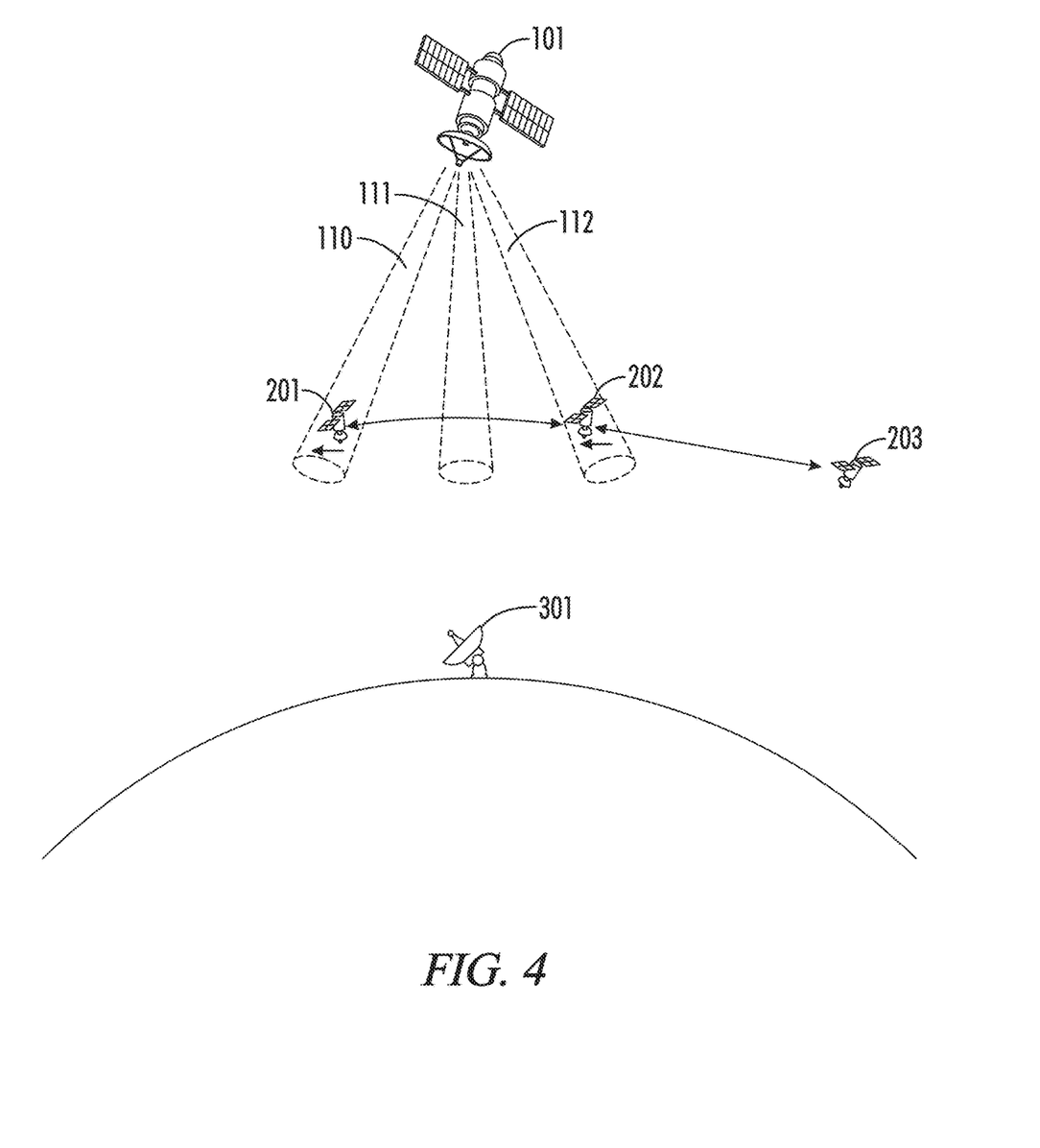
FIG. 4 is a schematic view of multiple ring-incorporated satellites within an exemplary satellite network ring in accordance with an embodiment of the present disclosure, illustrating communication management regarding a single external satellite.

FIG. 4 illustrates how multiple ring-incorporated satellites 201, 202 operate together with respect to a single external satellite 101. In the present illustration, external satellite 101 is a geosynchronous communications satellite located over ground station 301; however, external satellite 101 could be any other satellite that is not a ring-incorporated satellite, such as a research satellite, a positioning satellite, the moon, a space station, a space shuttle, a non-orbital satellite, or any LEO, middle earth orbit (MEO), GEO, high earth orbit (HEO), or elliptical orbital satellite. In FIG. 4, external satellite 101 includes three spot beams 110, 11, 112, and ring-incorporated satellites 201 and 202 are each within one of external satellite's 101 spot beams.

In one embodiment, ring-incorporated satellites can only receive communications from external satellite 101 while ring-incorporated satellites are inside a spot beam 110, 111, 112 of external satellite 101. Because ring-incorporated satellites 201, 202 are all in constant communication, they can take advantage of multiple simultaneous communication links with external satellite 101. The network management system (not shown) can simultaneously connect multiple ring-incorporated satellites 201, 202 to one or more external satellites 101, 102 (not shown) to achieve an increased bandwidth and transmission rate. The satellite network ring 200 is modular, so adding additional ring-incorporated satellites 201, 202, etc. into the satellite network ring 200 increases the total bandwidth of the system and increases the options for path optimization. In one embodiment, the satellite network ring always maintains two or more simultaneous communications connections between 2 connected points.

In addition to aggregate communication, the constant connection within the satellite network ring 200 enables a first ring-incorporated satellite 201 to seamlessly hand off communication with an external satellite 101 to another ring-incorporated satellite 202 to maintain the satellite network ring's 200 connection with external satellite 101 without interruption. In one embodiment, first ring-incorporated satellite 201 can communicate to second ring-incorporated satellite 202 when to take over communication with external satellite 101. In another embodiment, first ring-incorporated satellite 201 can communicate to external satellite 101 when to expect second ring-incorporated satellite 202 to arrive within one of external satellite's 101 spot beams 112. In another embodiment, first ring-incorporated satellite 201 can continue its link with external satellite 101 as it passes from a first spot beam 110 to a second spot beam 111 to a third spot beam 112 and so on. In another embodiment, a leading ring-incorporated satellite 201 can communicate optimization instructions for a particular spot beam 112 or external satellite 101 to a trailing ring-incorporated satellite 202. In still another embodiment, first ring-incorporated satellite 201 can hand off its authentication handshake to second ring-incorporated satellite 202 to minimize connection establishment time with external satellite 110. Each of the disclosed optimizations between two ring-incorporated satellites 201, 202 could be applied to three or more ring-incorporated satellites.

Figure 5:
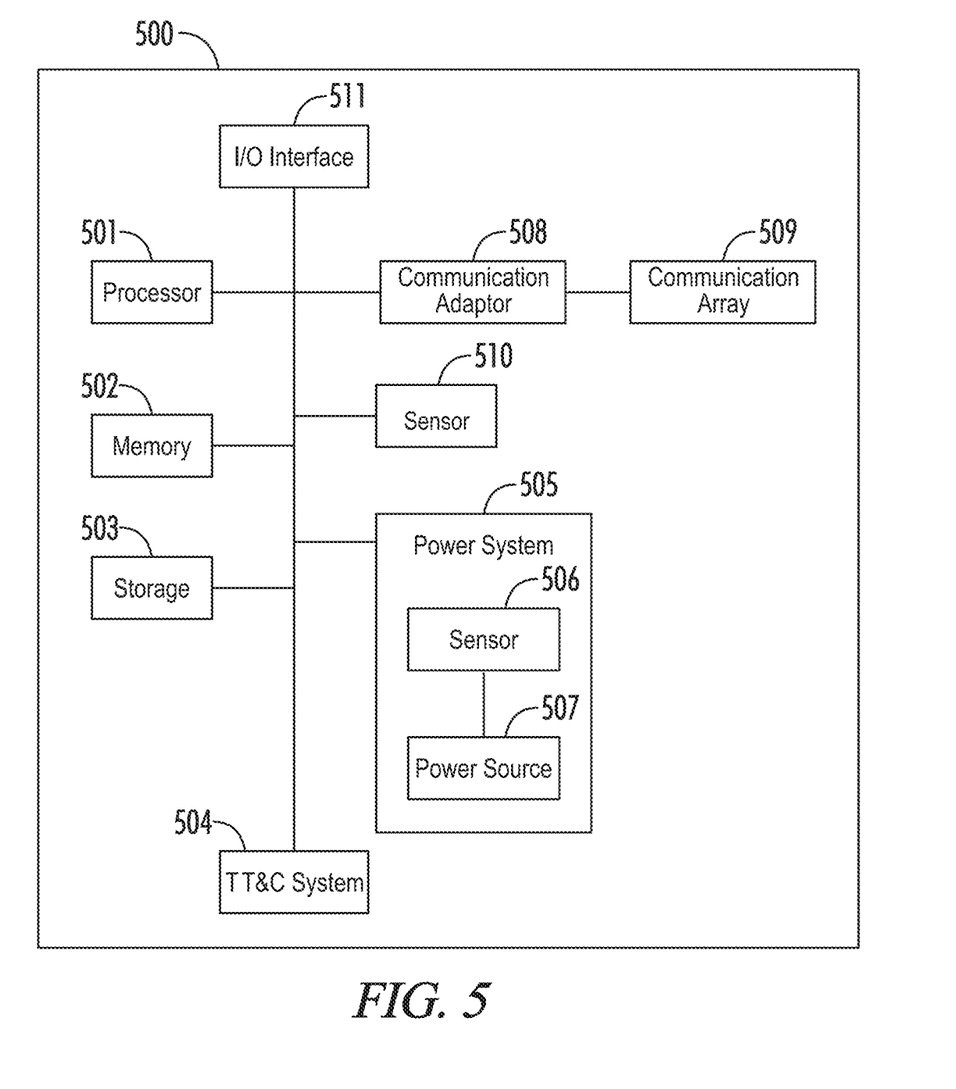
FIG. 5 is a block diagram of a computer system adaptable for use with one or more embodiments of the present invention.

FIG. 5 is a block diagram of a computing system 500 adaptable for use with one or more embodiments of the present disclosure. For example one or more portions of computing system 500 may be employed to perform the functions within a ring-incorporated satellite 201, 202, etc. of FIG. 2. Processor 501 is coupled to memory 502, data storage 503, TT&C System 504, power system 505, communications array 508, sensors 510, and input/output interface 511. Power system 505 includes one or more batteries 506 and may include a power source 507 capable of recharging the batteries 506. Communications adaptor 508 is connected to one or more communications arrays 509.

One or more processors 501 are connected to persistent 503 and/or non-persistent 502 memory and control the operation of the power system 505, the communications adaptor 508 and communications array 509, and the data storage elements (also 502). Multiple inr-incorporated satellites 201, 202 can pool processing power to jointly manage computation for complicated processes. The processors 501 or the data storage elements 503 may include encryption and/or deduplication instructions to protect data and to optimize storage. The processors 501 may also include an authorization system to check access point credentials and make certain that the access point is authorized to send or retrieve data prior to providing access to the data storage element 503.

The data storage elements 503 are powered by the power system 505 and may comprise magnetic hard drives, flash memory, 3D NAND memory, 3D Xpoint, server class memory, DDR, holographic memory, other cache memory circuits or chips, and/or DNA storage. Some ring-incorporated satellites 201 may be storage satellites with a primary purpose of providing remote cloud storage. The data storage elements 503 may be specially configured, shielded, and mounted to dampen force and vibration during launch, the temperature and pressure extremes in the vacuum of space, and/or radiation exposure outside of a planetary magnetic field. A magnetic hard drive may be pressurized and sealed to enable operation in a vacuum. In some aspects, the data storage element 503 may suspend writing to the storage element or completely power down during periods of intense radiation to minimize damage. Any instruction or data received during disabled or suspended recording periods may be returned to the originating storage satellite or directed to another ring-incorporated satellite 203. If the instruction or data is received from a communications satellite or relay satellite 101, the instruction or data will be directed to an alternate ring-incorporated satellite for recording. The data storage element 503 may also enter a low power or idle mode. The low power or idle mode may be beneficial to conserve power consumption, reduce heat, or disable some of the data storage elements during low traffic periods. The data storage elements 503 may be shielded to minimize radiative interference. The data storage element 503 may include the ability to flip or rewrite any corrupted bits. Data storage elements 503 may be modular, replaceable, or expandable. The data storage elements 503 may redundantly store data on multiple locations within and between storage satellites to securely back up data. In some cases an instruction received at the communications array 509 from another ring-incorporated satellite 203 may bypass the processor 501 and go directly to the data storage element 503 to be recorded (or to a different communications array 509' to be retransmitted).

The power source 507 may include any of a solar panel, thermal harvesting, atomic fusion, atomic fission, chemical decay, or a free electron gathering system) electrically coupled to one or more batteries. In one embodiment, the power source 507 is a solar panel that can collect solar energy to power the ring-incorporated satellite 201 and charge the batteries 506. The batteries provide back-up power when the satellite is shaded from the sun's rays by a planet or other body. In one aspect, the storage satellite includes robotics and electronic instructions capable of opening and closing the solar panel or directing the solar panel toward or away from the source of light to increase or decrease the energy absorbed. It may be beneficial to increase energy absorption prior to entering or just after leaving the earth's shade. It may additionally be beneficial to decrease energy absorption when the battery is near full or the satellite needs to reduce thermal energy. Power source 507 may include solar panels 507' (not shown) to absorb solar energy or some other independent power source. In some embodiments, the satellite includes robotics and programming to optimize solar energy absorption, including opening and closing the solar array and directing the absorption panels toward or away from the sun or another source of light. The satellite's batteries 506 stores energy collected at the solar panels 507', enabling the satellite to continue functioning during periods when the earth or another object blocks the sun's rays. In some embodiments, the satellite is capable of closing or angling the solar panels 507' away from the sun when the battery is charged above a predetermined threshold to minimize excess heat.

The communications array 509 can include a wireless communications system (e.g., laser communication link, microwave relay, or radio frequency transmission) capable of communicating with the other ring-incorporated satellites 202, 203 in the satellite network ring 200. The ring-incorporated satellite 201 may communicate with end-users via optical laser communication links and/or via any approved radio frequencies (e.g., L-band, S-band, C-band, X-band, Ku-band, K-band, Ka-band, V-band, and W-band, or any other ITU-recognized frequency) approved for use by the authorized United Nations governing body, the International Telecommunications Union (ITU). In one aspect each ring-incorporated satellite's 201 communications array is in constant communication with the communications arrays of the leading satellite immediately in front and the trailing satellite immediately behind. The satellite network ring 200 can create a continuous network, allowing any ring-incorporated satellites 201 to send data and instructions to or retrieve data and instructions from any other satellite in the network. In another aspect, each satellite is additionally capable of communicating with two or more satellites ahead and two or more satellites behind to improve network reliability and performance. Ring-incorporated satellite 201 can also communicate with other satellites in alternate orbital planes or orbital radii. In one aspect, the communications array 509 can additionally send and retrieve data and instructions with one or more communications satellites, and the one or more communications satellites send and retrieve data and instructions with the access points. As previously discussed, in some embodiment it may be preferable for the communications array 509 can send and retrieve data and instructions directly with the ground stations 301, 302.

In some embodiments, a ring-incorporated satellite 201 includes a position determining system (not shown), proximity detection (not shown), collision detection (not shown), temperature detection (not shown), radiation detection (not shown), a satellite telemetry, tracking and control (TT&C) transmission equipment 504 for navigational positioning, an input/output interface 511, and a guidance or propulsion system (not shown) so that the ring-incorporated satellite 201 can self-correct for orbital decay or adjust satellite spacing to optimize the addition or subtraction of other ring-incorporated satellites 202 into the satellite network ring 200.

In one embodiment, the satellite cloud network comprises a number of storage satellites travelling in a low-earth orbit (between 160 kilometers and 2000 kilometers above the surface of the earth). Although orbital satellites are discussed in many embodiments, it should be obvious to one having ordinary skill in the art that a similar network relying on sub-orbital elements such as balloons, blimps, dirigibles, aircraft, watercraft, stationary data centers, or any combination thereof may be incorporated into a network without departing from the present invention. Each storage satellite is in communication with the satellite in front and the satellite behind it, creating a continuous loop or ring connecting each satellite in the ring. If one satellite stops working, all remaining storage satellites remain in network communication by sending data through the opposite direction. Additional or redundant satellites can also increase the flexibility and survivability of the network system.

Figure 6:
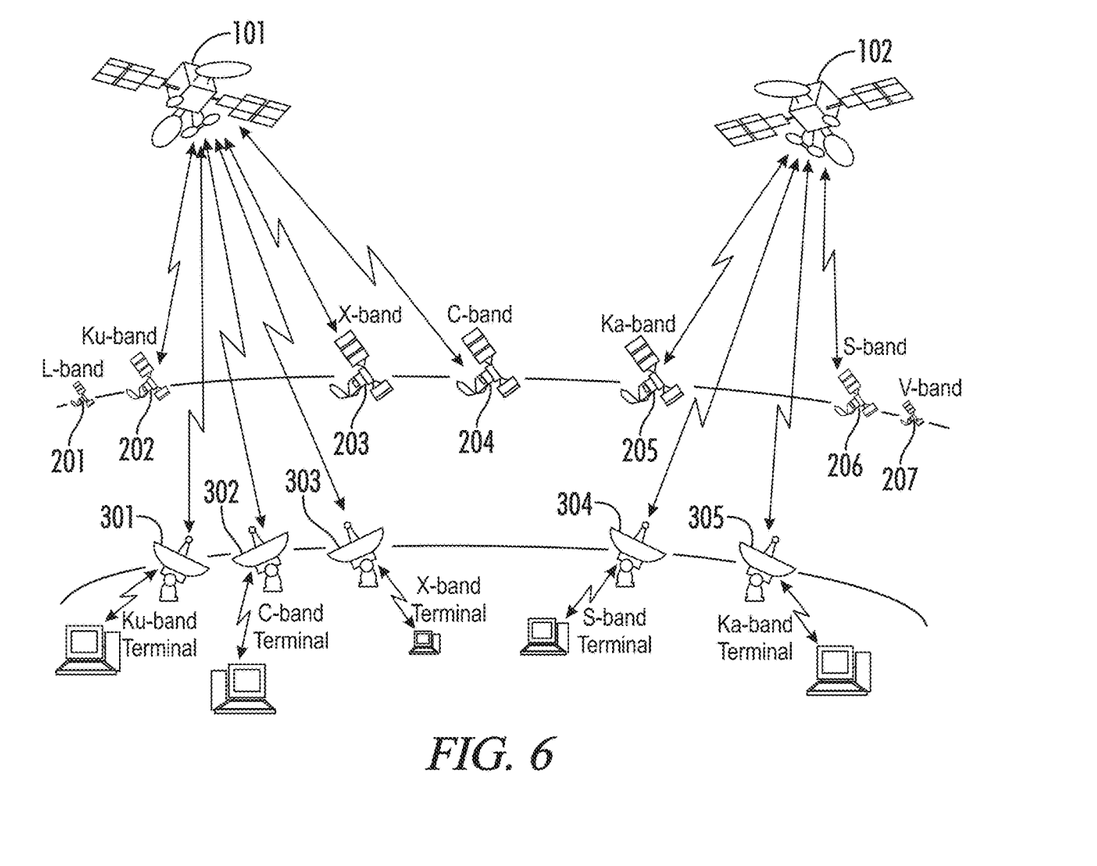
FIG. 6 is a schematic view of multiple ring-incorporated satellites within an exemplary satellite network ring in accordance with an embodiment of the present disclosure, illustrating cross-strapping communication between external satellites and ground stations.

FIG. 6 illustrates an alternate embodiment of the satellite network ring 200 demonstrating that each ring-incorporated satellite 201, 202, 203, 204, 205, 206, 207 may communicate in a different band or serve a different purpose. In the present embodiment, each ring-incorporated satellite 201, 202, 203, 204, 205, 206, 207 is capable of receiving a different band of microwave communication (e.g., L-band, S-band, C-band, X-band, Ku-band, K-band, Ka-band, and V-band), so the satellite network ring 200 is capable of cross-strapping communications satellites without transmitting the signal to and from ground terminals or ground stations 301, 302, 303, 304, 305 located on the surface of the Earth. Geostationary communications satellite 101 broadcasts in the Ku-band, the X-band, and the C-band. Geostationary communications satellite 102 broadcasts in the Ka-band and the S-band.

Because all of the ring-incorporated satellites 201, 202, 203, 204, 205, 206, 207 within satellite network ring 200 are communicatively linked, a Ku-band signal intercepted by ring-incorporated satellite 202 or a C-band signal intercepted by ring-incorporated satellite 204 from geostationary communications satellite 101 can be sent across the satellite network ring and transmitted to geostationary communications satellite 102 in a different frequency band from the frequency the signal was received. Instead of incorporating a swarm of cross-strapping satellites each incorporating arrays capable of communicating via all or many of the frequency bands, the satellite network ring enables cross-strapping between satellites communicating in different microwave bands through single-band relay satellites.

In the present embodiment, X-band satellite 203 can receive the X-band communication from geostationary communications satellite 101, transmit that signal via optical laser to Ka-band satellite 205 (either directly or through intermediary ring-incorporated C-band satellite 204). Ka-band satellite 205 can transmit the signal to geostationary communications satellite 102, which, in turn, retransmits the signal to Ka-band terminal 305. Through the satellite network ring 200, a plurality of relatively cheap single-frequency (or limited frequency) band relay satellites may be capable of cross-strapping existing satellite systems without relying on intermediate ground-stations, which may significantly reduce the upstream congestion for ground stations.

Because each of these ring-incorporated satellites communicates within the ring, information can be rapidly transmitted between any two points, and because each individual satellite can be simply constructed, the system is cheaply and modularly expandable to enable communication with any existing or new satellite system. This satellite network ring 200 enables providers to decongest local upstream resources during peak traffic by offloading non-latency sensitive traffic through the satellite network ring 200 to non-peak ground stations 301.

Additionally, in at least one embodiment, the system as described is capable of converting a modulated signal from one frequency (e.g., RF, optical, microwave, etc.) to another frequency without de-modulating or re-modulating the signal, thereby enabling the system to quickly convert and transmit the signal without additional delays caused by processing the signal in any way.

Although various aspects and implementations are herein disclosed in the context of certain preferred embodiments, implementations, and examples, it will be understood by those skilled in the art that the present invention extends beyond the specifically disclosed embodiments to other alternative embodiments and/or uses of the inventive aspects and obvious modifications and equivalents thereof. In addition, while a number of variations of the aspects have been noted, other modifications, which are within their scope, will be readily apparent to those of skill in the art based upon this disclosure. It should be also understood that the scope this disclosure includes the various combinations or sub-combinations of the specific features and aspects of the embodiments disclosed herein, such that the various features, modes of implementation and operation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A space-based electronic data transfer network comprising:
    a plurality of communicatively linked low-earth orbit satellites occupying one or more orbital planes forming at least one continuous communication loop about the Earth, wherein a first content received by a first communicatively linked low-earth orbit satellite from a first geostationary communications satellite is transmitted to a second communicatively linked low-earth orbit satellite, wherein the second communicatively linked low-earth orbit satellite transmits the first content to a second geostationary communications satellite to be transmitted to a ground station;
    wherein the frequency of the communication link between the first geostationary communications satellite and the first communicatively linked low-earth orbit satellite is within a first frequency band and the communication link between the second communicatively linked low-earth orbit satellite and the second geostationary communications satellite is within a second frequency band;
    wherein the first frequency band is different from the second frequency band; and
    wherein the first frequency band is translated to the second frequency band within the first communicatively linked low-earth orbit satellite.

2. The space-based electronic data transfer network according to claim 1 wherein a second ground station in direct communication with the second geostationary communications satellite is operating at a high upstream traffic load and the plurality of communicatively linked low-earth orbit satellites redirects upstream traffic from a first ground station in direct communication with the first geostationary communications satellite, the first ground station experiencing a lower upstream traffic load than the second ground station.

3. The space-based electronic data transfer network according to claim 1 wherein the first frequency band falls within the Ku-band and the second frequency band falls within the K-band.

4. The space-based electronic data transfer network according to claim 1 wherein the first frequency band falls within the Ku-band and the second frequency band falls within the Ka-band.

5. The space-based electronic data transfer network according to claim 1 wherein the first frequency band falls within the Ku-band and the second frequency band falls within the C-band.

6. The space-based electronic data transfer network according to claim 1 wherein the first frequency band falls within the K-band and the second frequency band falls within the Ku-band.

7. The space-based electronic data transfer network according to claim 1 wherein the first frequency band falls within the K-band and the second frequency band falls within the Ka-band.

8. The space-based electronic data transfer network according to claim 1 wherein the first frequency band falls within the K-band and the second frequency band falls within the C-band.

9. The space-based electronic data transfer network according to claim 1 wherein the first frequency band falls within the Ka-band and the second frequency band falls within the Ku-band.

10. The space-based electronic data transfer network according to claim 1 wherein the first frequency band falls within the Ka-band and the second frequency band falls within the K-band.

11. The space-based electronic data transfer network according to claim 1 wherein the first frequency band falls within the Ka-band and the second frequency band falls within the C-band.

12. The space-based electronic data transfer network according to claim 1 wherein the first frequency band falls within the C-band and the second frequency band falls within the Ku-band.

13. The space-based electronic data transfer network according to claim 1 wherein the first frequency band falls within the C-band and the second frequency band falls within the K-band.

14. The space-based electronic data transfer network according to claim 1 wherein the first frequency band falls within the C-band and the second frequency band falls within the Ka-band.

15. The space-based electronic data transfer network according to claim 1 wherein the space-based electronic data transfer network is modularly expandable.

16. The space-based electronic data transfer network according to claim 1 wherein the signal is converted from the first frequency band to the second frequency band without de-modulating or re-modulating the signal.

17. The space-based electronic data transfer network according to claim 1 wherein the translation from the first frequency band occurs within the first communicatively linked low-earth orbit satellite.

* * * * *